United States Patent
Kamihara (10) Patent No.: US 7,985,507 B2
(45) Date of Patent: Jul. 26, 2011

(54) FUEL CELL SYSTEM AND RELATED METHOD

(75) Inventor: Tetsuya Kamihara, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1923 days.

(21) Appl. No.: 10/516,123

(22) PCT Filed: Oct. 23, 2003

(86) PCT No.: PCT/JP03/13565
§ 371 (c)(1),
(2), (4) Date: Nov. 30, 2004

(87) PCT Pub. No.: WO2004/049489
PCT Pub. Date: Jun. 10, 2004

(65) Prior Publication Data
US 2006/0051632 A1    Mar. 9, 2006

(30) Foreign Application Priority Data
Nov. 27, 2002   (JP) ................... 2002-344380

(51) Int. Cl.
  *H01M 8/06*   (2006.01)
  *H01M 8/04*   (2006.01)
(52) U.S. Cl. ......... 429/415; 429/410; 429/408; 429/428
(58) Field of Classification Search ............ 429/408, 429/410, 415, 428, 433, 443, 444, 454, 455, 429/512, 513
See application file for complete search history.

(56) References Cited

U.S. PATENT DOCUMENTS

| | | | | |
|---|---|---|---|---|
| 4,876,115 A | * | 10/1989 | Raistrick | 429/42 |
| 5,677,073 A | * | 10/1997 | Kawatsu | 429/22 |
| 6,242,120 B1 | * | 6/2001 | Herron | 429/22 |
| 6,436,562 B1 | | 8/2002 | DuBose | |

(Continued)

FOREIGN PATENT DOCUMENTS

CA    2 293 898 A1    7/2000

(Continued)

OTHER PUBLICATIONS

"Ejector." Dictionary.com Unabridged (v 1.1). Random House, Inc. May 9, 2008. <Dictionary.com http://dictionary.reference.com/browse/ejector>.*

*Primary Examiner* — Dah-Wei D Yuan
*Assistant Examiner* — Edu E Enin-Okut
(74) *Attorney, Agent, or Firm* — Foley & Lardner LLP (57) ABSTRACT

A fuel cell system (S) is provided with a fuel cell (1) supplied with hydrogen gas and oxidizing gas, a gas supply line (5) supplying the hydrogen gas to the fuel cell, a gas exhaust line (31) passing exhaust hydrogen gas expelled from the fuel cell with the exhaust hydrogen gas being able to contain nitrogen, a gas recirculation line (7) recirculating the exhaust hydrogen gas to the fuel cell at an upstream thereof, a purge valve (8) adapted to discharge the exhaust hydrogen gas, containing the nitrogen, to an outside, and a controller (100) operative to close the purge valve when judgment is made that a flow rate of the exhaust hydrogen gas passing through the purge valve during an opened state of the purge valve is equal to or greater than a predetermined value.

21 Claims, 5 Drawing Sheets

U.S. PATENT DOCUMENTS

| | | | |
|---|---|---|---|
| 2001/0018139 A1* | 8/2001 | Aoyama et al. | 429/19 |
| 2002/0022167 A1 | 2/2002 | Herron | |
| 2002/0094469 A1 | 7/2002 | Yoshizumi et al. | |
| 2004/0241511 A1* | 12/2004 | Kamihara et al. | 429/22 |
| 2005/0244686 A1* | 11/2005 | Kamihara | 429/22 |
| 2006/0051635 A1* | 3/2006 | Kamihara | 429/25 |
| 2007/0148512 A1* | 6/2007 | Goto et al. | 429/23 |

FOREIGN PATENT DOCUMENTS

| | | | |
|---|---|---|---|
| EP | 1 429 409 | | 6/2004 |
| JP | 61051773 A | * | 3/1986 |
| JP | 09-022714 A | | 1/1997 |
| JP | 09-213353 A | | 8/1997 |
| JP | 2001-266922 A | | 9/2001 |
| JP | 2002-093438 A | | 3/2002 |
| JP | 2002093438 A | * | 3/2002 |
| JP | 2002-246045 A | | 8/2002 |
| WO | WO 00/02282 A1 | | 1/2000 |
| WO | WO 00/39877 A1 | | 7/2000 |
| WO | WO 01/97308 A2 | | 12/2001 |
| WO | WO 01/97311 | | 12/2001 |
| WO | WO-02/37588 A1 | | 5/2002 |

\* cited by examiner

FUEL CELL SYSTEM AND RELATED METHOD

TECHNICAL FIELD

The present invention relates to a fuel cell system and its related method and, more particularly, to a fuel cell system and its related method wherein nitrogen is efficiently discharged from a hydrogen gas recirculation line of a fuel cell in which hydrogen expelled from the fuel cell is recirculated for reuse.

BACKGROUND ART

With a polymer electrolyte fuel cell using hydrogen as fuel, excessive hydrogen expelled from a fuel cell stack is supplied to an inlet of the fuel cell stack whereby hydrogen is supplied to the fuel cell stack at a larger supply rate than that of hydrogen to be consumed in the fuel cell stack for enabling stable electric power generation.

Japanese Patent Application Laid-Open Publication No. 2001-266922 discloses a fuel cell system that includes an ejector whose secondary flow guide pipe is introduced with exhaust fuel, expelled from a fuel exhaust port of a fuel cell stack, through a check valve, with exhaust fuel expelled from the fuel cell being recirculated through the ejector. By recirculating excessive hydrogen expelled from the fuel cell stack to an inlet of the fuel cell stack through the ejector, it attempts to achieve stable electric power generation while supplying hydrogen to the fuel cell stack at a larger supply rate than that of hydrogen to be consumed in the fuel cell stack without deserting the excessive hydrogen.

DISCLOSURE OF INVENTION

However, upon studies conducted by the present inventor, in such a fuel cell system in which the hydrogen is recirculated as described above, when using air as oxidizing agent, it is thought that nitrogen contained in air diffuses from a cathode to an anode through a membrane of the fuel cell stack. This leads to an increase in a nitrogen concentration in the hydrogen.

If the nitrogen concentration in the hydrogen increases in such a way, a drop takes place in a hydrogen partial pressure, resulting in degradation in an electric power generating efficiency. Additionally, it is considered that a recirculation rate of the ejector that recirculates the hydrogen decreases and a stable electric power generation cannot be maintained.

To address such an issue, it is considered that a purge valve is disposed to allow the recirculated hydrogen to be discharged from a hydrogen recirculation passage to an atmosphere and the purge valve is periodically opened to allow nitrogen to be discharged from the hydrogen line. However, it is conceived that if the purge valve is opened, the hydrogen is caused to be discharged together with nitrogen and, hence, if the purge valve is continuously opened for a time interval more than necessary, degradation occurs in an efficiency of the fuel cell system.

Therefore, the present invention has been completed with the above described studies conducted by the present inventor and has an object to provide a fuel cell system and its related method in which nitrogen diffused in a hydrogen line is discharged while minimizing the amount of hydrogen to be concurrently discharged with nitrogen for providing a high operating efficiency.

To achieve the above object, one aspect of the present invention is a fuel cell system which comprises: a fuel cell supplied with hydrogen gas and oxidizing gas; a gas supply line supplying the hydrogen gas to the fuel cell; a gas exhaust line passing exhaust hydrogen gas expelled from the fuel cell, the exhaust hydrogen gas being able to contain nitrogen; a gas recirculation line recirculating the exhaust hydrogen gas to the fuel cell at an upstream thereof; a purge valve adapted to discharge the exhaust hydrogen gas, containing the nitrogen, to an outside; and a controller operative to close the purge valve when judgment is made that a flow rate of the exhaust hydrogen gas passing through the purge valve during an opened state of the purge valve is equal to or greater than a predetermined value.

Stated another way, another aspect of the present invention is a fuel cell system which comprises: a fuel cell supplied with hydrogen gas and oxidizing gas; gas supply means supplying the hydrogen gas to the fuel cell; gas discharging means for discharging exhaust hydrogen gas expelled from the fuel cell to an outside, the exhaust hydrogen gas being able to contain nitrogen and the gas discharging means including purge means for purging the exhaust hydrogen gas, containing the nitrogen, to the outside; gas recirculation means for recirculating the exhaust hydrogen gas to the fuel cell at an upstream thereof; and control means for controlling the purge means so as to close the purge means when judgment is made that a flow rate of the exhaust hydrogen gas passing through the purge means during an opened state of the purge means is equal to or greater than a predetermined value.

In the meanwhile, according to the other aspect of the present invention, there is provided a method of controlling a fuel cell system, which has a fuel cell supplied with hydrogen gas and oxidizing gas, a gas supply line supplying the hydrogen gas to the fuel cell, a gas exhaust line passing exhaust hydrogen line expelled from the fuel cell with the exhaust hydrogen gas being able to contain nitrogen, a gas recirculation line recirculating the exhaust hydrogen gas to the fuel cell at an upstream thereof and a purge valve adapted to discharge the exhaust hydrogen gas, containing the nitrogen, to an outside, the method comprising: closing the purge valve when judgment is made that a flow rate of the exhaust hydrogen gas passing through the purge valve during an opened state of the purge valve is equal to or greater than a predetermined value.

Other and further features, advantages, and benefits of the present invention will become more apparent from the following description taken in conjunction with the following drawings.

BEST MODE FOR CARRYING OUT THE INVENTION

A fuel cell system and its related method of each embodiment according to the present invention are described hereunder in detail with suitable reference to the accompanying drawings.

First Embodiment

First, referring to FIGS. 1 to 6, a fuel cell system and its related method of a first embodiment of the present invention are described in detail.

Figure 1:
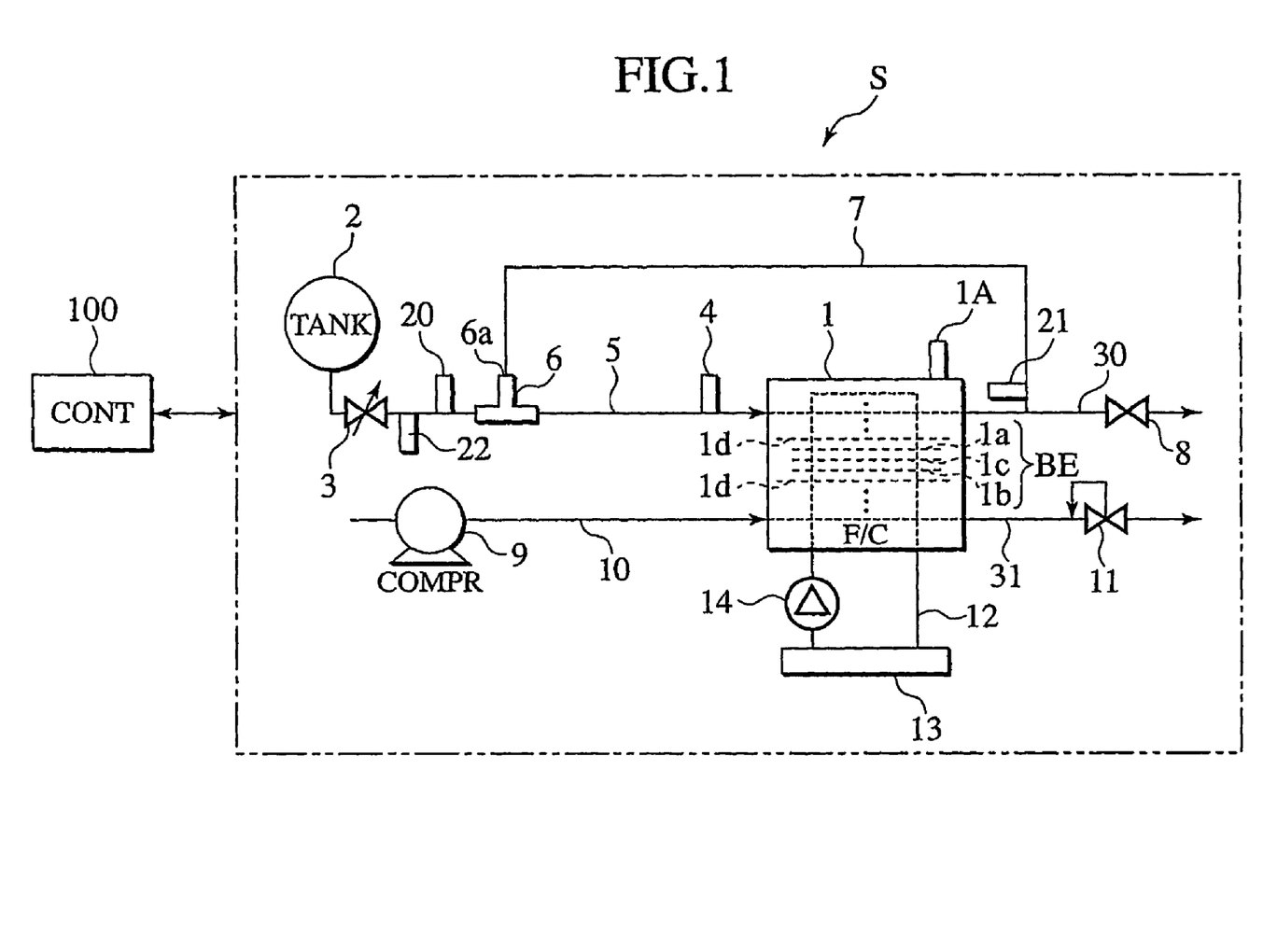
FIG. 1 is a view illustrating a structure of a fuel cell system of a first embodiment according to the present invention.

FIG. 1 is a view illustrating a structure of the fuel cell system of the presently filed embodiment.

As shown in FIG. 1, the fuel cell system S of the presently filed embodiment is comprised of a fuel cell stack 1 that uses hydrogen as fuel and air as oxidizing agent to generate electric power, a hydrogen tank 2 that stores hydrogen gas, an ejector 6 through which the hydrogen gas is recirculated, a pressure sensor 4 disposed in an upstream side of the fuel cell stack 1 to detect a pressure of the hydrogen gas at an inlet of the fuel cell stack 1, and a purge valve 8 disposed in a downstream side of the fuel cell stack 1 to allow nitrogen, contained in exhaust hydrogen gas expelled from the fuel cell stack 1, to be discharged to the atmosphere together with the exhaust hydrogen.

More particularly, the fuel cell stack 1 is constructed of a plurality of stacks of fuel cell structural bodies BE, with separators 1d being interleaved between adjacent components, each of which includes a fuel electrode (also referred to as a hydrogen electrode) 1a and an opposing oxidizing electrode (also referred to as an air electrode) 1b with a solid polymer membrane 1c being interleaved. Also, while FIG. 1 shows, for the sake of convenience, only one fuel cell structural body BE that is sandwiched between a pair of separators 1d, 1d, it is to be noted that no limitation is intended to the number of pieces of stacks.

The hydrogen stored in the hydrogen tank 2 typically takes the form of gas, which is supplied to the fuel cell stack 1 through a hydrogen delivery conduit 5 through which the hydrogen tank 2 and the fuel cell stack 1 is connected. Here, a supply rate of the hydrogen gas is regulated by a hydrogen pressure regulator valve 3 that is disposed in the hydrogen delivery conduit 5 to enable to variably adjust a restriction rate thereof and then, such regulated hydrogen gas is supplied to the fuel cell stack 1.

The ejector 6 is disposed in the hydrogen delivery conduit 5 between the hydrogen pressure regulator valve 3 and the fuel cell stack 1. Excessive hydrogen expelled from the fuel cell stack 1 is returned to an intake port 6a of the ejector 6 through a hydrogen return conduit 7 extending from an exhaust hydrogen conduit 30, disposed downstream of the fuel cell stack 1, at an upstream side of the purge valve 8, thereby permitting the hydrogen gas to be recirculated to the fuel cell stack 1 through the ejector 6. This allows the fuel cell stack 1 to be operative to maintain stable electric power generation while enabling a reaction efficiency to be increased.

The pressure sensor 4 is disposed in the hydrogen delivery conduit 5 between the ejector 6 and the fuel cell stack 1 in connection with an inlet of the fuel cell stack 1 and detects a pressure of the hydrogen gas to be supplied to the fuel cell stack 1.

The purge valve 8 remains closed during normal operation of the fuel cell stack 1 and serves as a valve that when a concentration of the nitrogen, diffused from the air electrode 1b of the fuel cell stack 1 into a hydrogen line, increases in the hydrogen line, is operative to expel the nitrogen to the outside, together with the excessive hydrogen, that is, the exhaust hydrogen gas expelled from the fuel cell stack 1. Here, in theory, the hydrogen line includes a supply line starting from the hydrogen tank 2 and extending to the purge valve 8 through the hydrogen delivery conduit 5 located with component elements such as the ejector 6 and the pressure sensor 4, the fuel cell stack 1 and the exhaust hydrogen conduit 30 and, further, includes a recirculation line extending to the ejector 6 and connected to the hydrogen delivery conduit 5 through the exhaust hydrogen conduit 30 and the hydrogen return conduit 7. However, an objective region to be estimated as a region, in which the nitrogen diffused from the air electrode 1b of the fuel cell stack 1 is present, is a line comprised of the ejector 6, the hydrogen delivery conduit 5 extending from the ejector 6 to the fuel cell stack 1, the fuel cell stack 1, the exhaust hydrogen conduit 30 extending from the fuel cell stack 1 to the purge valve 8, the hydrogen return conduit 7 connected to the exhaust hydrogen conduit 30 and extending to the ejector 6, and the purge valve 8 and, in the presently filed embodiment, such a line is specifically termed the "hydrogen line".

Disposed at an upstream of the ejector 6 are a pressure sensor 20 that detects a pressure of the hydrogen gas in the hydrogen delivery conduit 5 at the upstream of the ejector 6, and a temperature sensor 22 that detects a temperature of the hydrogen gas in the hydrogen delivery conduit 5 at the upstream of the ejector 6.

For the purpose of detecting a temperature of the exhaust hydrogen gas at an inlet of the purge valve 8, a temperature sensor 21 is disposed at the inlet of the purge valve 8. The temperature of the exhaust hydrogen gas, at the inlet of the purge valve 8, to be detected by the temperature sensor 21 is used for determining a flow rate threshold, which will be described later, for judging whether purging is terminated. Also, in alternative, the temperature sensor 21 may be located in the hydrogen return conduit 7, as shown in FIG. 1, with no intention to be limited, and may be located in the exhaust hydrogen conduit 30.

In the meanwhile, with respect to the air line, air is supplied from a compressor 9 to the fuel cell stack 1 through an air delivery conduit 10 and exhausted to the atmosphere through an exhaust air conduit 31 and a variable restriction valve 11, serving as an air pressure regulator disposed on a downstream of the exhaust air conduit 31.

Further, disposed in a coolant passage 12 for cooling the fuel cell stack 1 is a radiator 13 for heat dissipation, with coolant being circulated by a coolant pump 14.

Furthermore, an ammeter 1A for detecting output current of the fuel cell stack 1 is mounted on the fuel cell stack 1.

Moreover, detected information resulting from various sensors such as the ammeter 1A, the pressure sensors 4, 20 and the temperature sensors 21, 22 are delivered to a controller 100 and, using such detected information, the controller 100 controls the various component elements of the above-described fuel cell stack 1 at needs.

Figure 2:
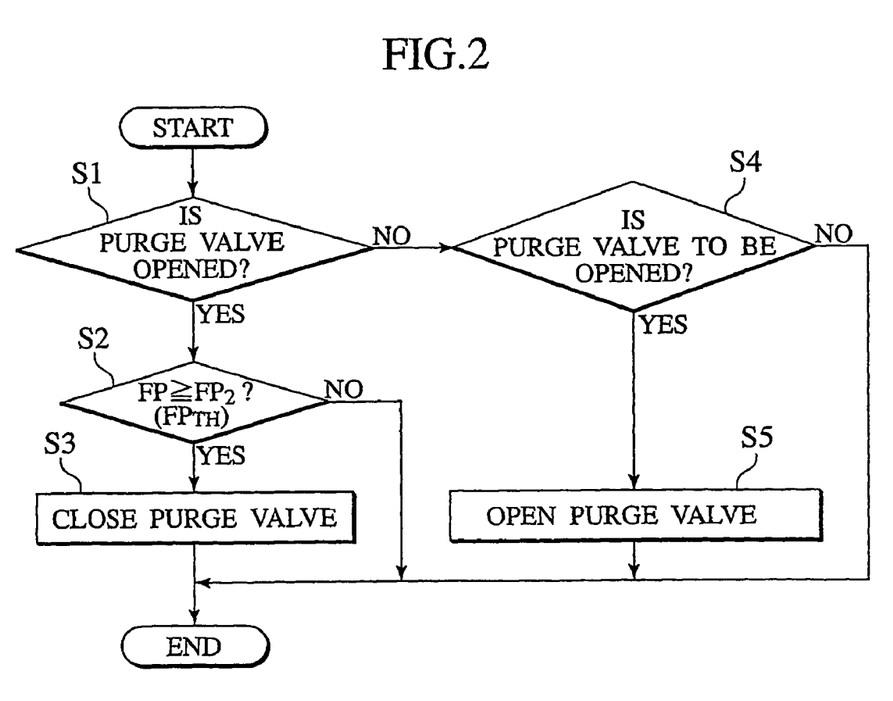
FIG. 2 is a flowchart illustrating control operation of the fuel cell system of the first embodiment.

Next, a basic sequence of a control operation of the fuel cell system with the structure set forth above is described mainly with reference to a flowchart of FIG. 2. Also, a control processing related to such a control operation is executed by the controller 100 at appropriate timings after start-up of the fuel cell system.

As shown in FIG. 2, first in step S1, judgment is made to find whether the purge valve 8 is currently opened and if the judgment is made that the purge valve 8 is open, the processing is routed to step S2. In contrast, if in step S1, the judgment is made that the purge valve 8 remains closed, the processing is routed to step S4.

In the next step S2, judgment is made to find whether a passing flow rate of the exhaust hydrogen gas in the purge valve 8 is equal to or exceeds a predetermined value, and if the judgment is made that the transient flow rate of the exhaust hydrogen gas in the purge valve 8 is equal to or exceeds the predetermined value, the processing is routed to step S3 whereupon in step S3, wherein the purge valve 8 is closed to terminate the current processing. On the contrary, in step S2, if the judgment is made that the transient flow rate of the exhaust hydrogen gas in the purge valve 8 remains less than the predetermined value, the purge valve 8 remains open.

In contrast, if the judgment is made in step S1 that the purge valve 8 remains closed, judgment is made in step S4 to find whether now is the time for opening the purge valve 8 whereupon if the judgment is made that now is the time for opening, the processing is routed to step S5 where the purge valve 8 is opened to terminate the current processing. Such judgment for the time for opening such a purge valve 8 is conducted using a drop in a cell voltage detected by the fuel cell stack 1 with no limitation being intended thereto and it may be possible to set appropriate timings in which no hindrance occurs in opening the purge valve 8. Incidentally, in step S4, if the judgment is made that now is not the time for opening the purge valve 8, the current processing is terminated with the purge valve 8 being closed.

By the way, here, a study is conducted of the relationship between a concentration C of the nitrogen in the hydrogen line and the flow rate FC of the recirculated hydrogen gas in which the excessive hydrogen expelled from the fuel cell stack 1 is returned to the hydrogen delivery conduit 5 through the exhaust hydrogen conduit 30, the hydrogen return conduit 7 and the ejector 6.

Figure 3:
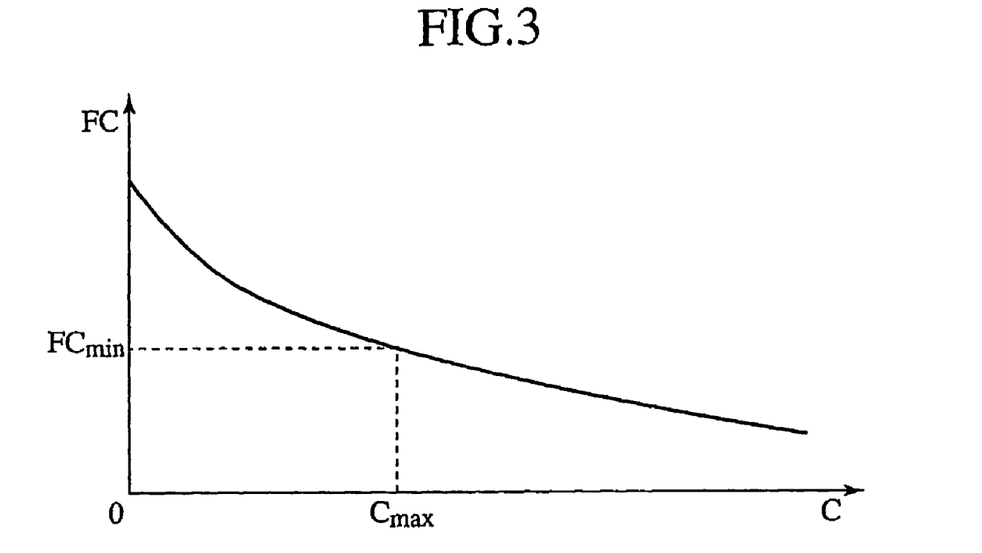
FIG. 3 is a view illustrating the relationship between a nitrogen concentration in a hydrogen line and a flow rate of hydrogen gas recirculated through an ejector under a situation where a temperature of hydrogen gas and a pressure of hydrogen gas in the hydrogen line are kept constant, with the abscissa representing the nitrogen concentration C in the hydrogen line and the coordinate representing the flow rate FC of hydrogen gas recirculated through the ejector, in the first embodiment.

FIG. 3 is a view illustrating the relationship between the nitrogen concentration in the hydrogen line and the flow rate of the recirculated hydrogen gas formed of the exhaust hydrogen gas via the ejector under a situation where the temperature of the hydrogen gas and the pressure of the hydrogen gas in the hydrogen line remain constant and the abscissa represents the concentration C of the nitrogen in the hydrogen line while the coordinate represents the flow rate FC of the recirculated hydrogen gas via the ejector.

Assuming that no hydrogen is mixed in the hydrogen line, although it can be evaluated that the recirculated gas recirculating through the hydrogen line via the ejector 6 is substantially equivalent to the hydrogen gas, if the concentration of the nitrogen rises in the hydrogen line, a more increased volume of the nitrogen is liable to be mixed in such recirculated gas with a resultant drop in a hydrogen partial pressure in the recirculated gas. This causes, as shown in FIG. 3, the amount of the hydrogen in the recirculated gas, which is the flow rate FC of the recirculated hydrogen gas, in the hydrogen line to decrease with an increase in the concentration C of the nitrogen in the hydrogen line. Therefore, there is a need for the purge valve 8 to be opened for achieving the purge to lower the concentration of the nitrogen in the hydrogen line for thereby ensuring the flow rate of the recirculated hydrogen gas with a view to obtaining a desired amount of the hydrogen. Namely, the maximum value $C_{max}$ of the concentration of the nitrogen allowable in the hydrogen line is specified in relation to the minimum value $FC_{min}$ of the flow rate of the recirculated hydrogen gas required in the hydrogen line, and for the purpose of precluding the nitrogen concentration C allowable in the hydrogen line from exceeding such a maximum value $C_{max}$, there is a need for discharging the recirculated gas from the hydrogen line by opening the purge valve 8 and, in brief, for purging the nitrogen. That is, it can be said that the recirculated gas may be purged from the hydrogen line by keeping the nitrogen concentration in the hydrogen line at a value of C ($\leq C_{max}$).

However, when opening the purge valve 8 to purge the recirculated gas from the hydrogen line, not only the nitrogen is purged but also desired hydrogen gas tends to be discharged to the atmosphere. Therefore, a purge time interval needs to be appropriately set for opening the purge valve 8 and purging the recirculated gas from the hydrogen gas, that is, it is required to appropriately close the purge valve 8 and, next, such a purge time is studied.

Figure 4:
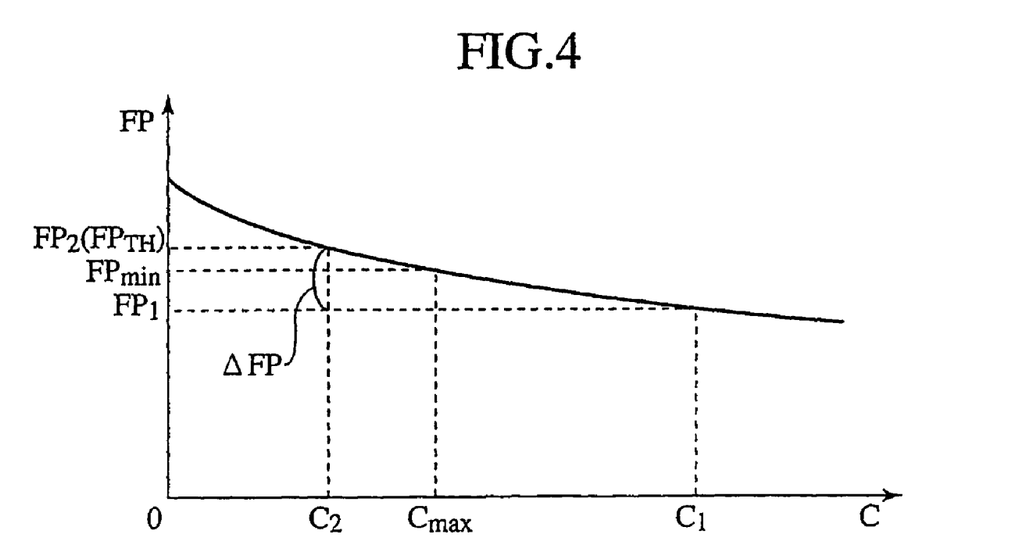
FIG. 4 is a view illustrating the relationship between the nitrogen concentration in the hydrogen line and the flow rate of hydrogen gas that is purged per unit time under the situation where the temperature of hydrogen gas and the pressure of hydrogen gas in the hydrogen line are kept constant, with the abscissa representing the nitrogen concentration C in the hydrogen line and the coordinate representing the flow rate FP of hydrogen gas that is purged per unit time, in the first embodiment.

FIG. 4 is a view illustrating the relationship between the nitrogen concentration in the hydrogen line and the flow rate of the exhaust hydrogen gas that is purged per unit time under a situation where both the temperature of the hydrogen gas and the pressure of the hydrogen gas in the hydrogen line are kept constant, with the abscissa representing the concentration C of the nitrogen in the hydrogen line while the coordinate represents the flow rate FP of the exhaust hydrogen gas that is purged per unit time.

As seen from FIG. 4, the flow rate FP of the exhaust hydrogen gas that is purged increases with a decrease in the concentration C of the nitrogen in the hydrogen line. When considering a situation where, supposing that the current concentration of the nitrogen in the hydrogen line remains at the value of $C_1$ ($>C_{max}$), the nitrogen concentration decreases from the maximum value $C_{max}$, which is allowable, to a value of $C_2$ ($\leq C_{max}$) with a further increased margin, the flow rate of the exhaust hydrogen gas that is purged varies from a point $FP_1$ to a point $FP_2$. This means that the presence of a situation where the flow rate of the exhaust hydrogen gas that is purged increases from the point $FP_1$ by $\Delta FP$ ($=FP_2-FP_1$) to reach the point $FP_2$ enables the judgment that the concentration of the nitrogen in the hydrogen line is adequately lowered.

Consequently, when turning back to step S2 in the flowchart of FIG. 2 for description, in a case where the judgment is made that the transient flow rate of the exhaust hydrogen gas in the purge valve 8 is equal to or exceeds the predetermined value, that is, when describing with reference to FIG. 4, that is, if the flow rate of the exhaust hydrogen gas that is purged is judged to be equal to or greater than the value of $FP_2$, this value is employed as a threshold $FP_{TH}$ and the purge valve 8 is closed with a view to terminating purge operation whereby, in theory, the purge valve 8 can be closed at a reasonable timing.

This allows the nitrogen concentration in the hydrogen line to be lowered, while enabling to prevent the hydrogen from being wastefully discharged.

Further, the relationship between the temperature of the exhaust hydrogen at the outlet of the fuel cell stack 1 and the flow rate of the exhaust hydrogen gas that is purged is studied.

Figure 5:
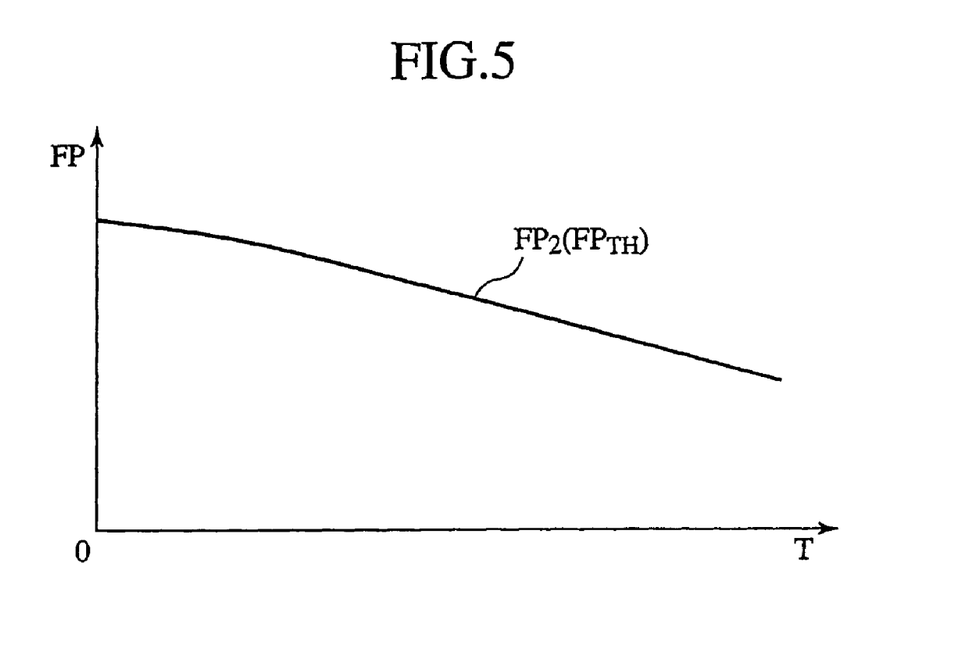
FIG. 5 is a view illustrating the relationship between the temperature of hydrogen gas at an outlet of a fuel cell stack and the flow rate of hydrogen gas that is purged under the situation where the nitrogen concentration and the pressure of hydrogen gas in the hydrogen line are kept constant, with the abscissa representing the temperature T of hydrogen gas at the outlet of the fuel cell stack and the coordinate representing the flow rate FP of hydrogen gas that is purged per unit time, in the first embodiment.

FIG. 5 is a view illustrating the relationship between the temperature of the exhaust hydrogen gas at the outlet of the fuel cell stack and the flow rate of the exhausted hydrogen gas that is purged under a situation where the concentration of the nitrogen and the pressure of the hydrogen gas in the hydrogen line are kept constant, with the abscissa representing the temperature T of the exhaust hydrogen gas at the outlet of the fuel cell stack while the coordinate represents the flow rate FP of the exhausted hydrogen gas that is purged per unit time.

With the fuel cell stack 1 being comprised of a polymer electrolyte fuel cell employing the electrolyte membrane 1c composed of a solid polymer electrolyte, at the exhaust hydrogen conduit 30, that is, at the outlet of the fuel cell stack 1 and the inlet of the purge valve 8, the exhaust hydrogen gas expelled from the fuel cell stack 1 assumes a status wherein steam is saturated or nearly saturated. For this reason, as the temperature at the inlet of the purge valve 8 detected by the temperature sensor 21 increases, the pressure of saturated steam develops and the flow rate of the gas at the outlet of the fuel cell stack 1 increases, with a resultant drop in the hydrogen partial pressure. Also, it may be considered that the temperature at the inlet of the purge vale 8 and the temperature at the outlet of the fuel cell stack 1 are substantially equal to one another. That is, as shown in FIG. 5, as the temperature T at the inlet of the purge valve 8 increases, that is, as the temperature T at the outlet of the fuel cell stack 1 increases, the flow rate FP of the exhaust hydrogen gas that is purged tends to decrease. Supposing that the flow rate of the exhaust hydrogen gas that is purged is set at the point $FP_2$ at which, in step S2 in the flowchart of FIG. 2, the purge valve 8 is to be closed, it is understood that the flow rate $FP_2$ of the exhaust hydrogen gas that is purged is sufficient to be set to a lower value as the temperature T at the inlet of the purge valve 8, that is, the temperature T at the outlet of the fuel cell stack 1 increases.

Accordingly, the threshold $FP_2$ ($FP_{TH}$) of the exhaust hydrogen gas that is purged when closing the purge valve 8 can be set to a lower value as the exhaust hydrogen temperatures at the inlet of the purge valve 8 and the outlet of the fuel cell stack 1 increase.

This enables the purge valve 8 to be closed while equally decreasing the nitrogen concentration in the hydrogen line regardless of the temperature of the exhaust hydrogen gas.

Further, the relationship between the pressure of the hydrogen gas at the inlet of the fuel cell stack 1 and the flow rate of the exhaust hydrogen gas that is purged is described.

Figure 6:
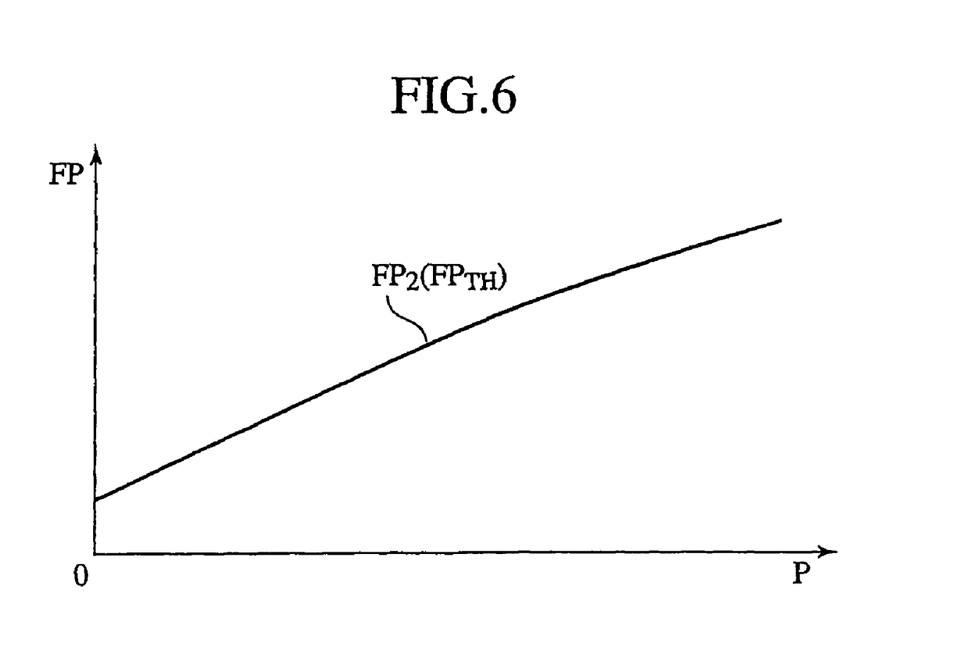
FIG. 6 is a view illustrating the relationship between the pressure of hydrogen gas at an inlet of the fuel cell stack and the flow rate of hydrogen gas that is purged under the situation where the nitrogen concentration in the hydrogen line and the hydrogen temperature such as at an inlet of a purge valve and the outlet of the fuel cell stack are kept constant, with the abscissa representing the pressure P of hydrogen gas at the inlet of the fuel cell stack and the coordinate representing the flow rate FP of hydrogen gas that is purged per unit time, in the first embodiment.

FIG. 6 is a view illustrating the relationship between the pressure of the hydrogen gas at the inlet of the fuel cell stack and the flow rate of the exhaust hydrogen gas that is purged under a situation where the concentration of the nitrogen and the temperature of the hydrogen gas at the inlet of the purge valve or that of the exhaust hydrogen gas at the outlet of the fuel cell stack remain constant, with the abscissa representing the pressure P of the hydrogen gas at the inlet of the fuel cell stack while the coordinate represents the flow rate FP of the exhaust hydrogen gas that is purged per unit time.

As seen from FIG. 6, the flow rate FP of the exhaust hydrogen gas that is purged decreases with a decrease in the pressure P of the hydrogen gas at the inlet of the fuel cell stack 1. Supposing that the flow rate of the exhaust hydrogen gas that is purged when closing the purge valve in step S2 in the flowchart of FIG. 2 is set to the point $FP_2$, it is understood that the flow rate $FP_2$ of the exhaust hydrogen gas that is purged when the purge valve 8 is to be closed is sufficient to be set to a lower value as the pressure P of the hydrogen gas at the inlet of the fuel cell stack 1 decreases.

Accordingly, the threshold $FP_2$ ($FP_{TH}$) of the flow rate of the exhaust hydrogen gas that is purged when closing the purge valve 8 can be set to a lower value as the pressure P of the hydrogen gas at the inlet of the fuel cell stack 1 decreases.

This enables the purge valve 8 to be closed while equally decreasing the nitrogen concentration in the hydrogen line regardless of the pressure of the hydrogen gas.

Next, description is made of how the flow rate of the exhaust hydrogen gas that is purged, that is, the flow rate of the exhaust hydrogen gas to be purged is obtained.

In particular, (i) the flow rate of the hydrogen gas supplied to the fuel cell system, (ii) the hydrogen gas consumed in the fuel cell system, and (iii) the flow rate of the hydrogen gas that is consumed for the purpose other than purging, are obtained and, from a resulting difference therebetween, the flow rate of the exhaust hydrogen gas to be purged is obtained.

First, description is made of how the flow rate of the hydrogen gas that is supplied to the fuel cell stack 1 within the fuel cell system is obtained.

In general, under a status where the ejector 6 takes the form of a choked condition, the flow rate of the hydrogen gas passing through the hydrogen pressure regulator valve 3 and supplied to the fuel cell stack 1 can be calculated from the pressure and temperature of the hydrogen gas at the area upstream of the ejector 6. In contrast, under a status where the ejector 6 takes the form of an non-choked condition, the flow rate of the hydrogen gas passing through the hydrogen pressure regulator valve 3 and supplied to the fuel cell stack 1 can be calculated from the pressure upstream of and the pressure downstream of the ejector 6 and additionally calculated in consideration of the upstream temperature of the ejector 6.

In the presently filed embodiment, since the nozzle of the ejector 6 takes the form of restriction to permit the flow rate of the hydrogen gas to be determined and takes the form of the choked condition, in theory, the flow rate of the hydrogen gas supplied to the fuel cell stack 1 can be calculated using the upstream pressure (supply pressure) and the downstream pressure (discharge pressure) of the hydrogen gas with respect to the ejector 6 detected by the pressure sensor 20 and the pressure sensor 4, respectively. Also, in a case where remarkable variation takes place in the temperature of the hydrogen gas supplied to the fuel cell stack 1, the flow rate of the hydrogen gas supplied to the fuel cell stack 1 can be calculated in a more accurate fashion by correcting the flow rate of the hydrogen gas using the upstream temperature of the hydrogen gas with respect of the ejector 6 detected by the temperature sensor 22.

Further, description is made of how the flow rate of the hydrogen gas, among the hydrogen gas consumed in the fuel cell system, consumed for the purpose other than purging is obtained.

In first place, it may be considered that the flow rate of the hydrogen gas consumed for the purpose other than such purging substantially corresponds to the flow rate of the hydrogen gas consumed in the fuel cell stack 1. Here, the flow rate of the hydrogen gas consumed in the fuel cell stack 1 is proportionate to the output current of the fuel ell stack 1. Accordingly, upon detection of the output current of the fuel cell stack 1 with the ammeter 1A mounted on the fuel cell stack 1, the flow rate of the hydrogen gas consumed in the fuel cell stack 1, namely, the flow rate of consumed the hydrogen gas for the purpose other than purging can be calculated.

Consequently, the flow rate of the exhaust hydrogen gas to be purged can be obtained by subtracting the flow rate of the hydrogen gas, consumed for the purpose other than purging, from the flow rate of the hydrogen gas supplied to the fuel cell system both of which are obtained in such ways described above and, from the resulting flow rate of the exhaust hydrogen gas for such purging, the flow rate of the exhaust hydrogen gas to be purged in step S2 in the flowchart of FIG. 2 can be set.

As set forth above, with the structure of the presently filed embodiment, it becomes possible to suppress the hydrogen from being wastefully discharged together with the nitrogen due to the excessive purging while precluding the electric power generation from being unstable due to the insufficient discharge of the nitrogen. This enables the stabled operation to be accomplished, thereby realizing the fuel cell system with a high efficiency.

Further, the temperature sensor 21 is provided for detecting the temperature of the gas passing through the purge valve 8, and the threshold value for enabling the closure control of the purge valve 8 is set such that the higher the gas temperature, the less will be the threshold value. This allows the amount of the hydrogen to be exhausted to be appropriately suppressed regardless of the gas temperature, with a resultant capability of realizing the fuel cell system with a high efficiency.

Furthermore, the pressure sensor 4 is provided for detecting the pressure of the hydrogen gas in the hydrogen supply passage, and the threshold value for enabling the closure control of the purge valve 8 is set such that the lower the gas pressure, the less will be the threshold value. This allows the amount of the hydrogen to be exhausted to be appropriately suppressed regardless of the gas pressure, with a resultant capability of realizing the fuel cell system with a high efficiency.

Moreover, the flow rate of the exhaust hydrogen gas passing through the purge valve 8 is obtained based on a difference between the amount of the hydrogen gas supplied to the fuel cell stack and the amount of the hydrogen gas consumed for the purpose other than that exhausted from the purge valve 8. By so doing, no sensor is newly required for directly measuring the transient flow rate of the purge valve 8 and, using the various sensors such as the pressure sensors 4, 20 and the temperature sensor 22 which are even used in a normal control mode, the flow rate of the gas passing through the purge valve 8 can be accurately obtained, thereby suppressing cost increase.

In addition, the flow rate of the hydrogen gas supplied to the fuel cell stack 1 is calculated based on the pressure of the hydrogen gas supplied to the ejector 6, or such a supply pressure and a discharge pressure from the ejector 6. By so doing, the system that has no a flow rate sensor for detecting the flow rate of the hydrogen gas can be used, and therefore cost increase can be suppressed.

Also, the flow rate of the hydrogen gas supplied to the fuel cell stack 1 is calculated based on the pressure of the hydrogen gas supplied to the ejector 6, or such a supply pressure and a discharge pressure and further the temperature of the hydrogen gas at the upstream of the ejector 6. By so doing, the flow rate of the hydrogen gas can be accurately calculated without the use of the flow sensor that detects the flow rate of the hydrogen gas.

Also, depending on the output current of the fuel cell stack 1 detected by the ammeter, the amount of the consumed hydrogen is calculated. This enables the amount of the consumed hydrogen to be accurately calculated through the use of the ammeter that would be used in normal control, thereby suppressing cost increase.

Incedentally, while the presently filed embodiment has been described in connection with a case where the ejector 6 for the recirculating hydrogen gas is used, the presently filed embodiment is not limited thereto and the hydrogen gas may be recirculated using a pump or blower in which even when using the pump or blower, since the hydrogen partial pressure drops as the nitrogen concentration increases like in the case where the ejector 6 is used and, therefore, a phenomenon occurs wherein the amount of the hydrogen gas supplied to the fuel cell stack 1 is in shortage and thus, it is possible to control the nitrogen concentration with a similar structure. However, there is a probability in that the flow rate sensor is separately disposed for detecting the flow rate of the hydrogen gas supplied to the fuel cell stack 1.

Further, although the position at which the pressure of the hydrogen gas to be detected for obtaining the threshold value of the flow rate of the exhaust hydrogen gas for closing the purge valve 8 has been described above in connection with the inlet of the fuel cell stack 1, it is needless to say that it is not objectionable for the pressure of the hydrogen gas to be detected at the outlet of the fuel cell stack 1. Also, in a case where a remarkable hydrogen pressure loss occurs in the fuel cell stack 1, the use of the pressure at the outlet side enables an accuracy to be increased.

Furthermore, while the hydrogen gas stored in the hydrogen tank 2 has been used as the fuel gas, of course, the presently filed embodiment is not limited thereto and another structure may be alternatively employed wherein fuel containing the hydrogen is reformed with a reformer at needs to obtain the hydrogen gas.

Also, although the presently filed embodiment has been described with reference to the polymer electrolyte fuel cell employing the solid polymer electrolyte as the electrolyte membrane 1c of the fuel cell stack 1, of course, another structure may be utilized provided that at the outlet of the fuel cell stack 1 or the inlet of the purge valve 8, the exhaust hydrogen gas expelled from the fuel cell stack 1 remains in a condition saturated with steam or in a condition nearly saturated with steam.

Second Embodiment

Figure 7:
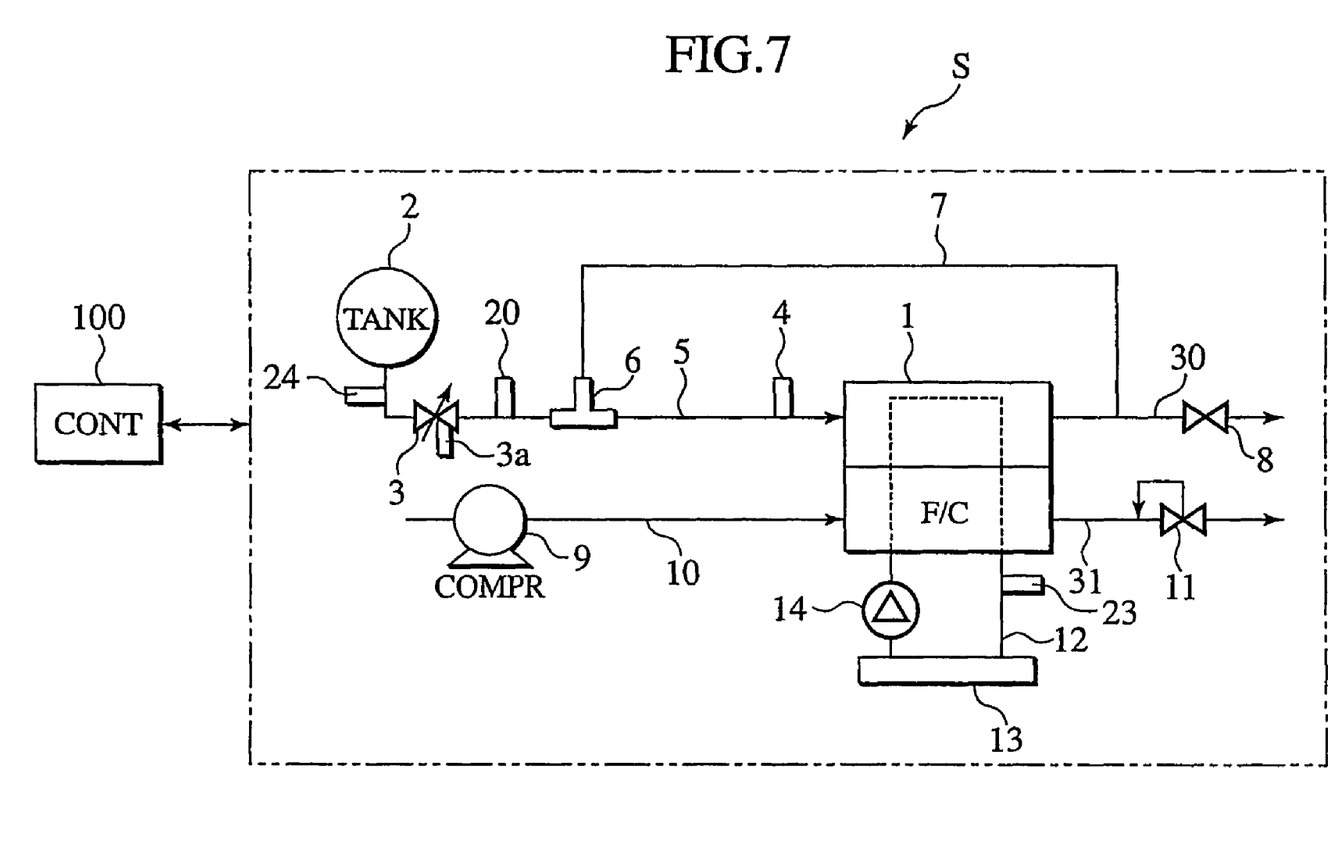
FIG. 7 is a view illustrating a structure of a fuel cell system of a second embodiment according to the present invention.

Next, a fuel cell system and its related method of the present invention of a second embodiment are described in detail mainly with reference to FIG. 7.

FIG. 7 is a view illustrating a structure of the fuel cell system of the presently filed embodiment.

As shown in FIG. 7, the fuel cell system of the presently filed embodiment differs from that of the first embodiment mainly in that a pressure sensor 24 is disposed upstream of the hydrogen pressure regulator valve 3 for detecting the pressure of the hydrogen gas to allow the flow rate of the supplied hydrogen gas to be calculated based on the pressures at the upstream and the downstream of the hydrogen pressure regulator valve 3 detected by the pressure sensor 24 and the pressure sensor 20 respectively and, therefore, aiming at such a differential point, like component parts bear the same reference numerals while description is suitably given in a simplified form or omitted.

In particular, the opening degree of the hydrogen pressure regulator valve 3 is detected by an opening sensor 3a mounted on the hydrogen pressure regulator valve 3, with resulting opening information being delivered to the controller 100 that controls closure of the hydrogen pressure regulator valve 3. And, the controller 100 obtains the flow rate of the hydrogen gas, on the same point of view as that of the first embodiment wherein the flow rate of the hydrogen gas supplied to the fuel cell stack 1 is obtained, using the upstream pressure and the downstream pressure of the ejector 6 in the first embodiment. That is, the flow rate of the hydrogen gas to be supplied can be calculated based on the opening degree of the hydrogen pressure regulator valve 3 and the upstream pressure of the hydrogen gas and the downstream pressure of the hydrogen gas related to the hydrogen pressure regulator valve 3.

More particularly, in a case where the opening degree of the hydrogen pressure regulator valve 3 remains small in a choked condition, the flow rate of the hydrogen gas to be supplied is calculated based on only the pressure of the hydrogen gas at a far upstream than the hydrogen pressure regulator valve 3 detected by the pressure sensor 24. On the contrary, in a case where the hydrogen pressure regulator valve 3 remains in a non-choked condition, the flow rate of the hydrogen gas to be supplied is calculated based on the pressure of the hydrogen gas at the upstream of the hydrogen pressure regulator valve 3 detected by the pressure sensor 24, and the pressure of the hydrogen gas at the downstream of the hydrogen pressure regulator valve 3 detected with the pressure sensor 20. Also, in the presently filed embodiment, the temperature sensor 22 used in the first embodiment is not essential and may be omitted.

Further, in the presently filed embodiment, as the temperature of the hydrogen gas to be supplied to the fuel cell stack 1, the temperature of coolant detected with a temperature sensor 23 disposed in the coolant flow passage 12 of the fuel cell stack 1 in place of the temperature sensor 21 used in the first embodiment. That is to say, it is possible to predict the temperature of the hydrogen gas based on the temperature of coolant because heat exchange occurs between the hydrogen gas and coolant within the fuel cell stack 1. Also, since the temperature of coolant can be more accurately detected than the temperature of the hydrogen gas, in a case where a remarkable change takes place in load of the fuel cell system and the temperature varies at a high speed, it is advantageous in that the temperature of coolant is more accurately detected than the temperature of the hydrogen gas.

As set forth above, with the presently filed embodiment, the flow rate of the hydrogen gas to be supplied to the fuel cell stack 1 is calculated based on the opening degree of the hydrogen pressure valve 3, disposed in the hydrogen delivery conduit 5 through which the hydrogen gas is supplied into the fuel cell system, and the upstream pressure and the downstream pressure of the hydrogen pressure regulator valve 3. This allows discharge of the exhaust hydrogen to be suppressed, with a resultant capability of realizing a fuel cell system with a high efficiency.

Moreover, while even the presently filed embodiment has been described in conjunction with a case where the ejector 6 is used for recirculating the exhaust hydrogen gas, the present invention is not limited thereto and the exhaust hydrogen gas may be recirculated using a pump or a blower, similarly permitting the flow rate of the supplied hydrogen gas based on the opening degree of the hydrogen pressure regulator valve 3 and the upstream and downstream pressures of the hydrogen gas to enable an appropriate time for closing the purge valve 8 to be obtained.

Also, although the temperature sensor 22 used in the first embodiment has been omitted, in a case where a change takes place in the temperature of the hydrogen gas supplied to the hydrogen pressure regulator valve 3, by separately disposing a temperature sensor for detecting the temperature of the hydrogen gas at the upstream of the hydrogen pressure regulator valve 3 and correcting the flow rate of the supplied hydrogen gas based on the temperature of the hydrogen gas detected with such a temperature sensor, of course, it is possible to calculate the hydrogen supply flow rate at a further accurate fashion.

Third Embodiment

Next, a fuel cell system and its related method of a third embodiment of the present invention are described in detail;

The fuel cell system of the presently filed embodiment differs from those of the first and second embodiments mainly in that the flow rate of the hydrogen gas, consumed for the purpose other than purging, which represents the flow rate of the hydrogen gas to be substantially supplied to the fuel cell system is calculated in a more strict fashion than that achieved in the first and second embodiments and as a structure of the presently filed embodiment, any of the structures of the first and second embodiments can be theoretically employed. Therefore, aiming at such a differential point, like component parts bear the same reference numerals to describe the presently filed embodiment while suitably simplifying description or omitting the same.

In particular, under a situation where the fuel cell system is installed in a vehicle, since a remarkable load change takes place with a rapid speed in variation, there is a probability wherein the pressure of the hydrogen gas to be supplied to the fuel cell stack 1 needs to be varied.

For example, in a case where the pressure of the hydrogen gas to be supplied to the fuel cell stack 1 is raised, the hydrogen gas is supplied to the fuel cell stack 1 at a larger flow rate than that of the hydrogen gas needed for generating electric power in the fuel cell stack 1 and, conversely, in a case where the pressure of the hydrogen gas to be supplied to the fuel cell stack 1 is lowered, the hydrogen gas is supplied to the fuel cell stack 1 at a further less flow rate. That is, this means that in a case where no consideration is taken for the flow rate of the hydrogen gas needed for additionally increasing or decreasing the flow rate of the hydrogen gas to be supplied to the hydrogen line in order to increase or decrease the pressure of the hydrogen gas, a probability occurs where no accurate calculation of the flow rate of the exhaust hydrogen gas to be purged can be accomplished during a so-called transition period in which the pressure of the hydrogen gas changes.

Here, the flow rate per se of the hydrogen gas needed to be supplied to the hydrogen line for increasing or decreasing the pressure of the hydrogen gas in the hydrogen line is proportionate to the amount of the change in such a pressure with its proportionate coefficient being determined in terms of a volume of the hydrogen line. As a consequence, in consideration of even a value of $c \times \Delta P$ resulting from the amount $\Delta P$ of the change in such a pressure multiplied by the coefficient c determined based on the volume of the hydrogen line, the flow rate of the hydrogen gas to be supplied to the fuel cell stack 1 within the fuel cell system needs to be obtained. In particular, the flow rate of the exhaust hydrogen gas to be purged is to be obtained using the flow rate of the hydrogen gas obtained in consideration of the change of the pressure in this manner, that is, the flow rate of the hydrogen gas obtained by adding the value of $c \times \Delta P$ resulting from the amount $\Delta P$ of the change in the pressure multiplied by the coefficient c determined based on the volume of the hydrogen line to the flow rate of the hydrogen gas that is to be consumed due to the necessity for the electric power generation.

Accordingly, the flow rate of the exhaust hydrogen gas to be purged can be calculated based on the amount of the change in the pressure of the hydrogen gas resulting from the amount of the change in the pressure of the hydrogen gas detected with the pressure sensor 4 shown in FIG. 1 or FIG. 7. This enables the calculation of the flow rate of the exhaust hydrogen to be purged even during a time period covering the transition period in which the pressure of the hydrogen gas changes.

As set forth above, with the presently filed embodiment, even in a case where the pressure of the hydrogen gas changes, it becomes possible to accurately calculate the flow rate of the exhaust hydrogen gas to be consumed for the purpose other than purging. This enables the flow rate of the exhaust hydrogen gas to be consumed for the purpose other than purging to be more accurately calculated and, thus, it becomes possible to more accurately control the nitrogen concentration in the hydrogen line during a phase in which the purge valve 8 is closed.

According to the present invention set forth above, since it is so arranged that the purge valve is closed when the transient flow rate of the gas passing through the purge valve is equal to or exceeds the predetermined value when the purge valve is opened, the nitrogen contained in the hydrogen gas can be adequately discharged from the hydrogen gas supply line while enabling to suppress the amount of hydrogen from being exhausted. This enables an efficiency of a fuel cell system to be increased.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

INDUSTRIAL APPLICABILITY

According to the present invention set forth above, in a case where the transient flow rate of gas passing through the purge valve is equal to or exceeds the predetermined value when the purge valve is opened, the purge valve is closed and hence, nitrogen contained in hydrogen gas can be adequately, enabling to increase an efficiency of a fuel cell system. Accordingly, such a fuel cell system can be applied to various fuel cell systems in which undesired substances, such as nitrogen, other than hydrogen is to be purged and can be applied to various devices such as a fuel cell powered automobile and electric power generators for industrial use or domestic use, with application being highly expected in a widened range.

The invention claimed is:

1. A fuel cell system comprising:
a fuel cell supplied with hydrogen gas and oxidizing gas;
a gas supply line supplying the hydrogen gas to the fuel cell;
a gas exhaust line passing exhaust hydrogen gas expelled from the fuel cell, the exhaust hydrogen gas being able to contain nitrogen in addition to hydrogen;
a gas recirculation line recirculating the exhaust hydrogen gas to the fuel cell at an upstream thereof;
a purge valve adapted to discharge the exhaust hydrogen gas, containing nitrogen, to outside; and
a controller configured to calculate a flow rate of the exhaust hydrogen gas passing through the purge valve and close the purge valve when the controller judges that the flow rate of the exhaust hydrogen gas calculated thereby is equal to or greater than a predetermined value.

2. The fuel cell system according to claim 1, wherein the fuel cell includes a fuel electrode and an oxidizing electrode with an electrolyte membrane being interleaved therebetween.

3. The fuel cell system according to claim 2, wherein electrolyte of the electrolyte membrane is comprised of a solid polymer electrolyte.

4. The fuel cell system according to claim 1, wherein the predetermined value is set to be a value that reflects a concentration of nitrogen, in the gas supply line, returned to the upstream of the fuel cell through the gas recirculation line and contained in the exhaust hydrogen gas.

5. The fuel cell system according to claim 1, further comprising a temperature sensor detecting a temperature of the exhaust hydrogen gas passing through the purge valve, wherein the predetermined value for use in closing the purge valve is set to decrease as the temperature of the exhaust hydrogen gas detected by the temperature sensor increases.

6. The fuel cell system according to claim 1, further comprising a pressure sensor detecting a pressure of the hydrogen gas in the gas supply line,
wherein the predetermined value for use in closing the purge valve is set to decrease as the pressure of the hydrogen gas detected by the pressure sensor increases.

7. The fuel cell system according to claim 1, wherein the flow rate of the exhaust hydrogen gas passing through the purge valve is obtained based on a difference between a supply rate of the hydrogen gas, supplied to the fuel cell, and a consumption rate of the hydrogen gas, among the hydrogen gas consumed in the fuel cell, except for the exhaust hydrogen gas discharged from the purge valve.

8. The fuel cell system according to claim 7, wherein the gas recirculation line includes an ejector, and the supply rate of the hydrogen gas supplied to the fuel cell is obtained based on a supply pressure of hydrogen gas supplied to the ejector or the supply pressure of hydrogen gas supplied to the ejector and a discharge pressure of the hydrogen gas discharged from the ejector.

9. The fuel cell system according to claim 8, wherein the supply rate of the hydrogen gas supplied to the fuel cell is obtained further based on a temperature of the hydrogen gas at an upstream of the ejector.

10. The fuel cell system according to claim 7, wherein the gas recirculation line includes a hydrogen pressure regulator valve regulating a pressure of the hydrogen gas supplied to the fuel cell, and the supply rate of the hydrogen gas supplied to the fuel cell is obtained based on an opening degree of the hydrogen pressure regulator valve, and a pressure of the hydrogen gas at an upstream of the hydrogen pressure regulator valve or the pressure of the hydrogen gas at the upstream of the hydrogen pressure regulator valve and a pressure of the hydrogen gas at a downstream of the hydrogen pressure regulator valve.

11. The fuel cell system according to claim 10, wherein the supply rate of the hydrogen gas supplied to the fuel cell is obtained further based on a temperature of the hydrogen gas at an upstream of the hydrogen pressure regulator valve.

12. The fuel cell system according to claim 7, wherein the consumption rate of the hydrogen gas except for the exhaust hydrogen gas discharged from the purge valve is obtained as a value that corresponds to a flow rate of the hydrogen gas to be used for the fuel cell to generate electric power.

13. The fuel cell system according to claim 12, wherein the consumption rate of the hydrogen gas except for the exhaust hydrogen gas discharged from the purge valve is obtained based on output current of the fuel cell.

14. The fuel cell system according to claim 12, wherein the consumption rate of the hydrogen gas except for the exhaust hydrogen gas discharged from the purge valve is obtained based on at least one of (i) a pressure of the hydrogen gas at an inlet of the fuel cell and (ii) a pressure of the hydrogen gas at an outlet of the fuel cell.

15. A fuel cell system comprising:
a fuel cell supplied with hydrogen gas and oxidizing gas;
gas supply means supplying the hydrogen gas to the fuel cell;
gas discharging means for discharging exhaust hydrogen gas expelled from the fuel cell to outside, the exhaust hydrogen gas containing nitrogen in addition to hydrogen and the gas discharging means including purge means for purging the exhaust hydrogen gas, containing nitrogen, to the outside;
gas recirculation means for recirculating the exhaust hydrogen gas to the fuel cell at an upstream thereof; and
control means configured to calculate a flow rate of the exhaust hydrogen gas passing through the purge means and controlling the purge means so as to close the purge means when the control means judges that the flow rate of the exhaust hydrogen gas calculated thereby is equal to or greater than a predetermined value.

16. A method of controlling a fuel cell system, which has a fuel cell supplied with hydrogen gas and oxidizing gas, a gas supply line supplying the hydrogen gas to the fuel cell, a gas exhaust line passing exhaust hydrogen gas expelled from the fuel cell with the exhaust hydrogen gas containing nitrogen in addition to hydrogen, a gas recirculation line recirculating the exhaust hydrogen gas to the fuel cell at an upstream thereof and a purge valve adapted to discharge the exhaust hydrogen gas, containing nitrogen, to outside, the method comprising:
calculating a flow rate of the exhaust hydrogen gas passing through the purge valve; and
closing the purge valve when the calculated flow rate of the exhaust hydrogen gas is equal to or greater than a predetermined value.

17. The method of claim 16, further comprising using a pressure sensor to detect a pressure of the hydrogen gas in the gas supply line, and setting the predetermined value for closing the purge valve to decrease as the pressure of the hydrogen gas detected by the pressure sensor increases.

18. The method of claim 16, further comprising obtaining the flow rate of the exhaust hydrogen gas passing through the purge valve by taking a difference between a supply rate of the hydrogen gas, supplied to the fuel cell, and a consumption rate of the hydrogen gas, among the hydrogen gas consumed in the fuel cell, except for the exhaust hydrogen gas discharged from the purge valve.

19. The method of claim 18, further comprising obtaining the consumption rate of the hydrogen gas except for the exhaust hydrogen gas discharged from the purge valve as a value that corresponds to a flow rate of the hydrogen gas to be used for the fuel cell to generate electric power.

20. The method of claim 19, further comprising obtaining the consumption rate of the hydrogen gas except for the exhaust hydrogen gas discharged from the purge valve based on output current of the fuel cell.

21. The method of claim 19, further comprising obtaining the consumption rate of the hydrogen gas except for the exhaust hydrogen gas discharged from the purge valve based on at least one of (i) a pressure of the hydrogen gas at an inlet of the fuel cell and (ii) a pressure of the hydrogen gas at an outlet of the fuel cell.

* * * * *